United States Patent [19]

Vinciguerra

[11] Patent Number: 5,335,564
[45] Date of Patent: Aug. 9, 1994

[54] CAM FOR REVOLVING DOBBY

[75] Inventor: Costantino Vinciguerra, Florence, Italy

[73] Assignee: Nuovopignone - Industrie Meccaniche e Fonderia S.p.A., Florence, Italy

[21] Appl. No.: 21,777

[22] Filed: Feb. 24, 1993

[30] Foreign Application Priority Data

Feb. 25, 1992 [IT] Italy .................. MI92A000409

[51] Int. Cl.⁵ .................. D03C 1/00; F16H 53/00
[52] U.S. Cl. .................. 74/567; 74/563; 133/66 R; 133/76; 133/455
[58] Field of Search .......... 74/567, 568 R, 569, 74/575, 578; 139/66 R, 76, 455

[56] References Cited

U.S. PATENT DOCUMENTS

| | | | |
|---|---|---|---|
| 3,180,366 | 4/1965 | Hoenig | 139/66 R |
| 3,207,186 | 9/1965 | Hoenig | 139/66 R |
| 3,724,510 | 5/1973 | Kleiner | 139/66 R |
| 4,329,458 | 7/1983 | Gummeringer | 74/567 X |
| 4,441,528 | 4/1984 | Julich | 139/66 R |
| 4,461,325 | 7/1984 | Palan et al. | 139/68 |
| 4,535,641 | 8/1985 | Kriz et al. | 74/569 X |
| 4,625,575 | 12/1986 | Le Bras | 74/567 X |
| 4,730,641 | 3/1988 | Schwarz | 139/76 |
| 4,803,889 | 2/1989 | Harris | 74/568 R |
| 4,854,236 | 8/1989 | Thunker et al. | 74/569 X |
| 4,905,738 | 3/1990 | Kleiner | 139/76 |
| 4,926,707 | 5/1990 | Yamada | 74/567 X |
| 4,932,277 | 6/1990 | Beaux | 74/569 X |
| 5,055,001 | 10/1991 | Natwick et al. | 74/569 X |
| 5,259,419 | 11/1993 | Vinciguerra et al. | 139/66 R |

FOREIGN PATENT DOCUMENTS 487407 12/1953 Italy ...................... 74/569

Primary Examiner—Vinh T. Luong
Attorney, Agent, or Firm—Morgan & Finnegan

[57] ABSTRACT

A cam for a revolving dobby includes a plate with an upwardly extending protective external edge, the external edge has two peripherally located, mutually opposite notches, key levers are associated with the plate and are protected by the external edge, thrust teeth on the auxiliary and drive pushers cooperate with the key levers. The thrust tooth of the drive pusher is rotatable hinged relative thereto and is rotated on the same axis as the auxiliary pusher, springs cooperate with the auxiliary and drive pushers to engage the key levers via one of the notches on the plate.

2 Claims, 4 Drawing Sheets

5,335,564

CAM FOR REVOLVING DOBBY

FIELD OF THE INVENTION

The present invention relates to a novel cam for a revolving dobby which, by preventing any sticking between the dobby organs consequent to abnormal situations deriving from wrong assemblies or incomplete key disengagement or engagement (keying) operations, or from fortuitous events of cam dragging due to the presence of foreign bodies entered between adjacent cams, secures an absolute safety of the dobby against any breakage risks even in the case when any of said exceptional situations arises, and furthermore makes it possible the same dobby to be constructed more simply and with greater precision, with consequent savings in manufacturing costs.

More specifically, the invention relates to an improvement in the cam used in our prior European Patent Appln. Public. No. 0 525 862 published on Feb. 3, 1993.

BACKGROUND OF THE INVENTION

As known from said prior patent application, each main connecting rod of the revolving dobby is mounted with its idle head on the intermittent-motion drive shaft which drives said dobby to revolve, through a cam which, by being interposed between said shaft and said main connecting rod head, is locked in its position by the action of the thrust tooth of an auxiliary pusher which, by being rotatably hinged onto the fixed body of the revolving dobby, cooperates with either of two radial, mutually opposite notches provided on the periphery of the same cam, or is made integral with said shaft by two swinging, mutually opposite keying levers pivotally installed on said cam and cooperating with each other at one of their ends, wherein a key is present which is urged by two springs to enter one from two, also radial, mutually opposite grooves provided in the drive shaft, with the disengagement of said key from the relevant groove being accomplished thanks to the cooperation of the thrust tooth of a drive pusher, also rotatably hinged onto said fixed body of the revolving dobby, with one of the free ends of said keying levers.

On the other hand, in as much as the need for locking in position the cam, and consequently the relevant main connecting rod, only arises simultaneously with the above said key disengagement, the movements of revolution of said auxiliary and drive pushers are always produced simultaneously through one single cam system.

Such a structure known from the prior art offers considerable advantages, but, unfortunately, is not absolutely free from risks of damaging its own organs under very special circumstances.

In fact, if, owing to an assembling mistake, the cam is not installed in such a way that either of both said locking notches thereof is in correspondence of said tooth of the auxiliary lock pusher so as to be capable of cooperating with it and consequently said tooth of the drive pusher is not in such a position as to be capable of cooperating with the free end of one of both key engagement levers, a subsequent motion of both pusher teeth towards the cam would generate, upon the revolution of the same cam, an interference between said mechanical parts, with consequent breakages.

On the other hand, a possible incomplete operation of key disengagement attained by moving said teeth of both pushers towards the cam in order to lock said cam in its position, leaving the key still partially inside the groove provided along the drive shaft, would keep said cam revolving and the cam, by interfering with the pushers in lowered position, would cause the same drawbacks as said above.

In the same way, an accidental dragging of the cam owing to various reasons, such as foreign bodies entering between adjacent cams, by causing an angular offset in the alignment between the tooth of the auxiliary pusher and the relevant locking notch and consequently between the tooth of the drive pusher and the end of the relevant keying lever, would unavoidably cause fatal sticking events between the above said mechanical organs.

Summing-up, the presence, on the peripheral edge of the cam, of two radial locking notches which must necessarily be provided in corresponding extensions of the same cam, showing more or less vertical walls, can cause, in certain abnormal situations, fatal sticking events to occur between said auxiliary pusher and said drive pusher and said walls of the locking notches.

OBJECTS AND SUMMARY OF THE INVENTION

The purpose of the present invention precisely is of obviating the above said drawbacks and hence supplying a cam for a revolving dobby, which secures always a perfect operation without any sticking events occurring between same dobby organs, independently of any abnormal circumstances which may possibly arise.

The above purpose is substantially achieved thanks to the above said asperities shown by the locking notches, which may cause sticking events to occur, being replaced by a plate, preferably a ring-shaped plate, with a jutting upwards protection external edge which, by being integral with the same cam, supports and protects, inside its jutting upwards edge, both said key engagement ("keying") levers, and furthermore is provided with two radial, mutually opposite notches which are exactly provided opposite to the free ends of said keying levers, with each of said keying levers cooperating with the thrust teeth of both the auxiliary and drive pushers which, for that purpose, are arranged superimposed to each other, and operate in the same direction.

In fact, in that way, no events of organ sticking may occur any longer, because, under abnormal circumstances, the movement towards the cam of the thrust teeth of the auxiliary pusher and of the drive pusher will be prevented now by said jutting upwards protection edge of said plate, which will oblige said teeth to slide, with pressure, along the external surface of said edge without interfering with the mobile dobby organs situated inside said jutting upwards edge, with which they will be capable of cooperating only in correspondence of said radial, mutually opposite, grooves of said plate, i.e., in their correct angular operating positions.

In this regard is then evident that, in order to allow the drive pusher to absorb, without breakages, that portion of movement which, by being forced by the drive cam system, is prevented by the above said protection edge of said plate, the tooth of said drive pusher must be made urged by a preloaded spring, i.e., the above said tooth is made rotatable on the same axis of the drive pusher and is kept urged by a preloaded spring against the shoulder integral with said drive pusher and relative to the auxiliary pusher.

Summing-up, the cam for revolving dobby which, interposed between the intermittent-motion drive shaft which drives said dobby and the head of one of the main connecting rods mounted idling on said shaft, is locked in its position by the action of the thrust tooth of an auxiliary pusher which, rotatably hinged on the fixed body of the revolving dobby and urged by a proloaded spring against a shoulder integral with the drive pusher, cooperates with one of two radial, mutually opposite notches provided on the periphery of the same cam, or is made integral with said shaft by two swinging, mutually opposite keying levers pivotally installed on said cam and cooperating with each other at one of their ends, wherein a key is present which is urged by two springs to enter one from two, also radial, mutually opposite grooves provided in the drive shaft, with the disengagement of said key from the relevant groove being accomplished thanks to the cooperation of the thrust tooth of said drive pusher, also rotatably hinged onto the same axis of said auxiliary pusher and urged by a spring against a fixed shoulder, with one of the free ends of said key engaging levers, is characterized according to the present invention in that with it a plate is integral, which is provided with a jutting upwards protection external edge, which supports and protects, inside its jutting upwards edge, both said key engagement ("keying") levers, and furthermore is provided, on its peripheral edge, exactly opposite to the free ends of said keying levers, with said two radial, mutually opposite notches, each of which cooperates with both the thrust tooth of said auxiliary pusher and the thrust tooth of said drive pusher, which, for that purpose, are arranged superimposed to each other, and operate in the same direction, with said thrust tooth of said drive pusher being hinged with possibility of rotation relatively to said drive pusher on the same axis of said auxiliary pusher and being kept urged by a preloaded spring against said shoulder integral with the drive pusher.

Then according to a preferred embodiment of the present invention, said plate with jutting upwards protection edge is in the form of a ring concentric with said cam.

The invention is better explained now by referring to the accompanying drawings, which illustrate a preferred form of embodiment given for merely illustrative, non-limitative purposes because technical or structural variants may always be supplied without departing from the scope of the present invention.

DETAILED DESCRIPTION OF THE INVENTION

Figure 1:
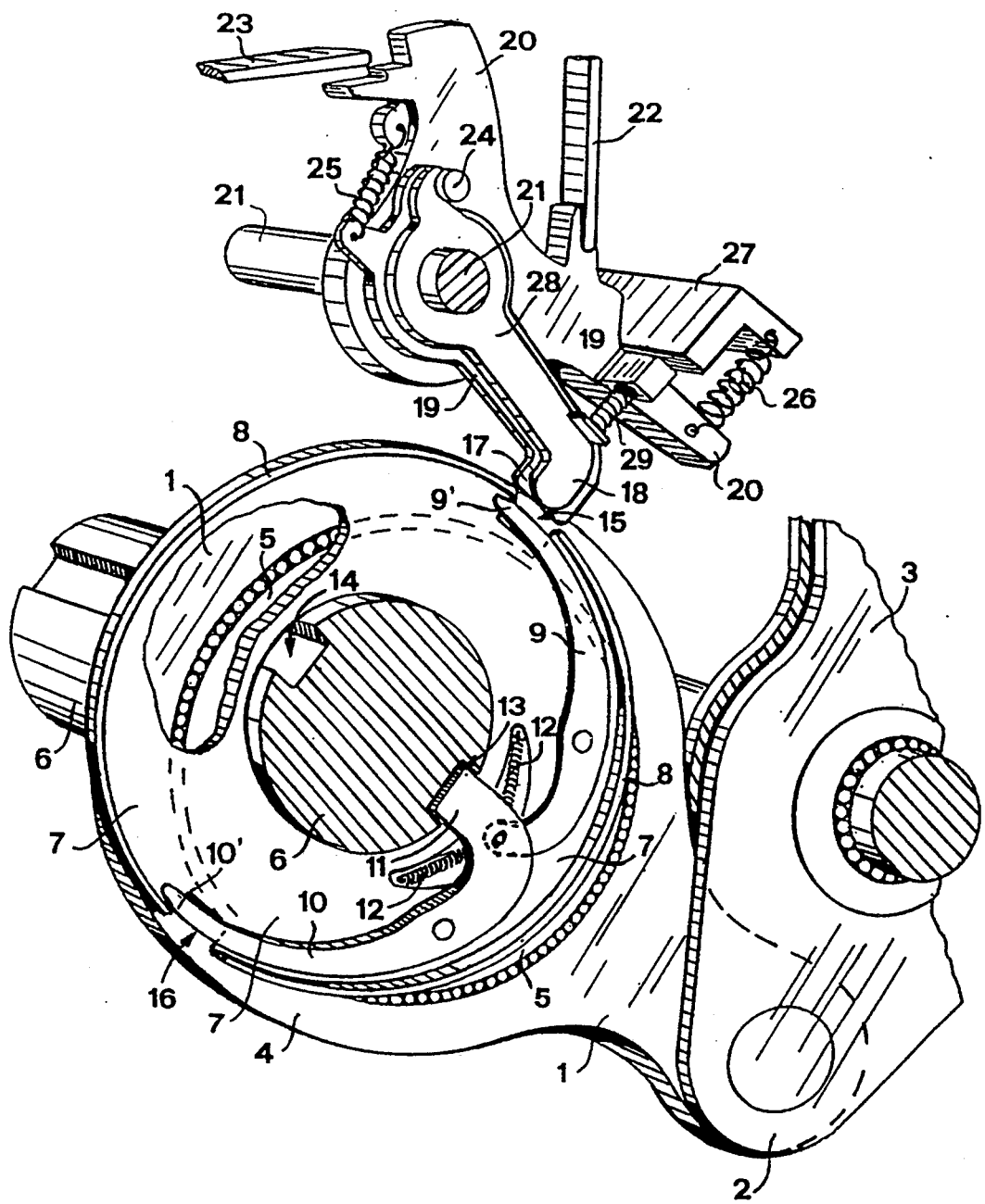
FIG. 1 shows a partial perspective view of a revolving dobby adopting a cam made according to the invention.

Referring to the Figures, with 1 one of the main connecting rods of the revolving dobby is indicated, whose foot 2 is hinged onto the respective main lever 3 and whose head 4 is mounted idling, through the interposition of a cam 5, on the dobby drive shaft 6 which is driven to move with intermittent motion, more precisely with a revolving motion with pauses after every rotation of 180°. Said cam 5 is integral with a plate 7 of substantially ring shape, which is provided with an external jutting upwards edge 8 which acts as a protection edge for both keying levers 9 and 10 which, pivotally hinged, mutually opposite, onto said plate 7, cooperate with each other at one of their ends wherein a key 11 is provided which is urged by springs 12 to enter one of two radial, mutually opposite grooves 13 and 14 provided along the drive shaft 6.

Opposite to the free ends, respectively 9' and 10', of both said keying levers 9 and 10, the plate 7 is furthermore provided, on its peripheral edge, with the two radial, mutually opposite notches 15 and 16, each of which is suitable for cooperating with the thrust teeth 17 and 18, superimposed to each other and acting in the same direction, respectively of the auxiliary pusher 19 and of the drive pusher 20 which, by being hinged onto a same shaft 21 parallel to the drive shaft 6, are actuated, in a known way, by striking bars 22 and 23 driven by cam drive means not displayed in the figures.

Figure 2:
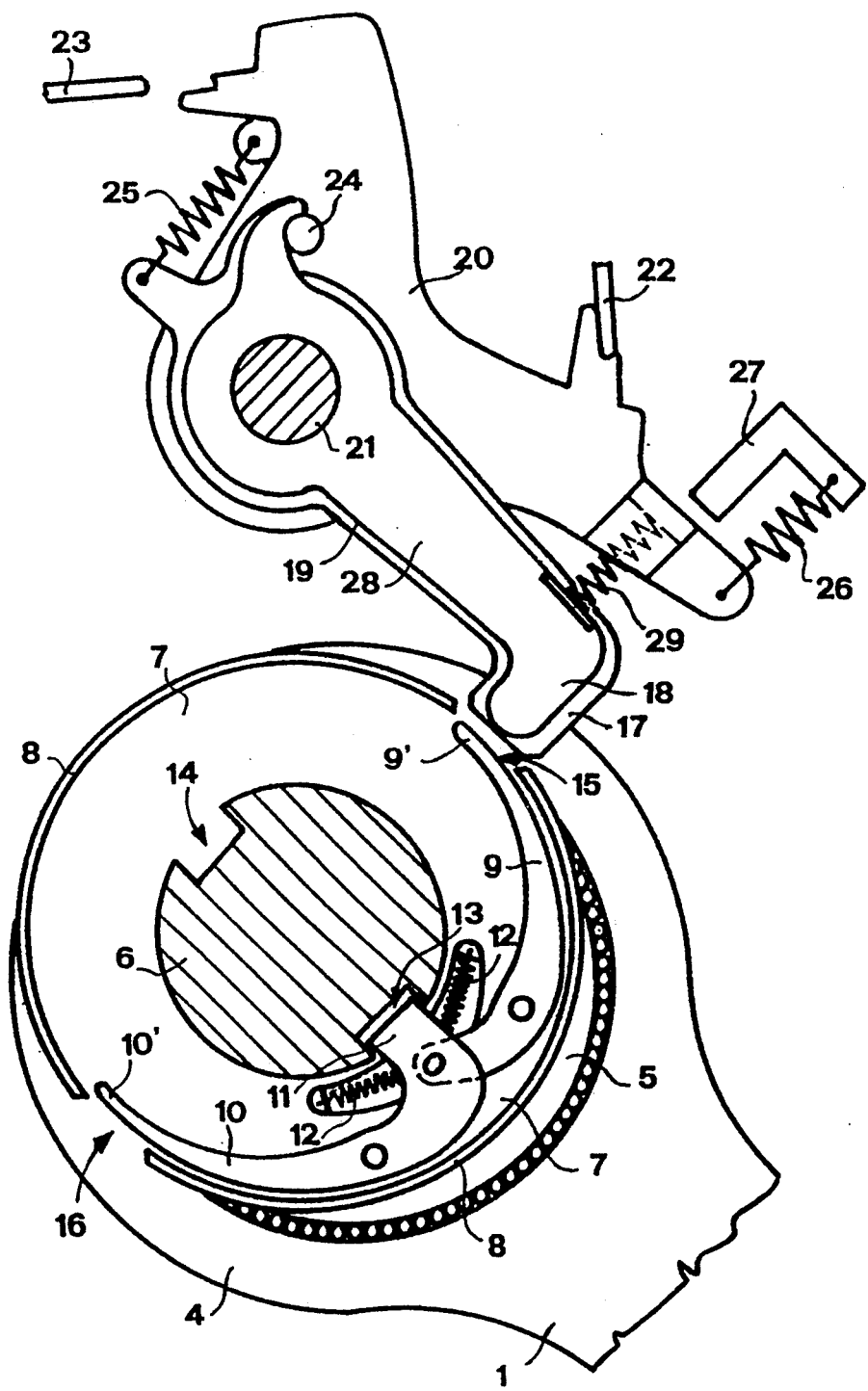
FIG. 2 shows a side view, on a different scale, of the portion of revolving dobby of FIG. 1.
Figure 3:
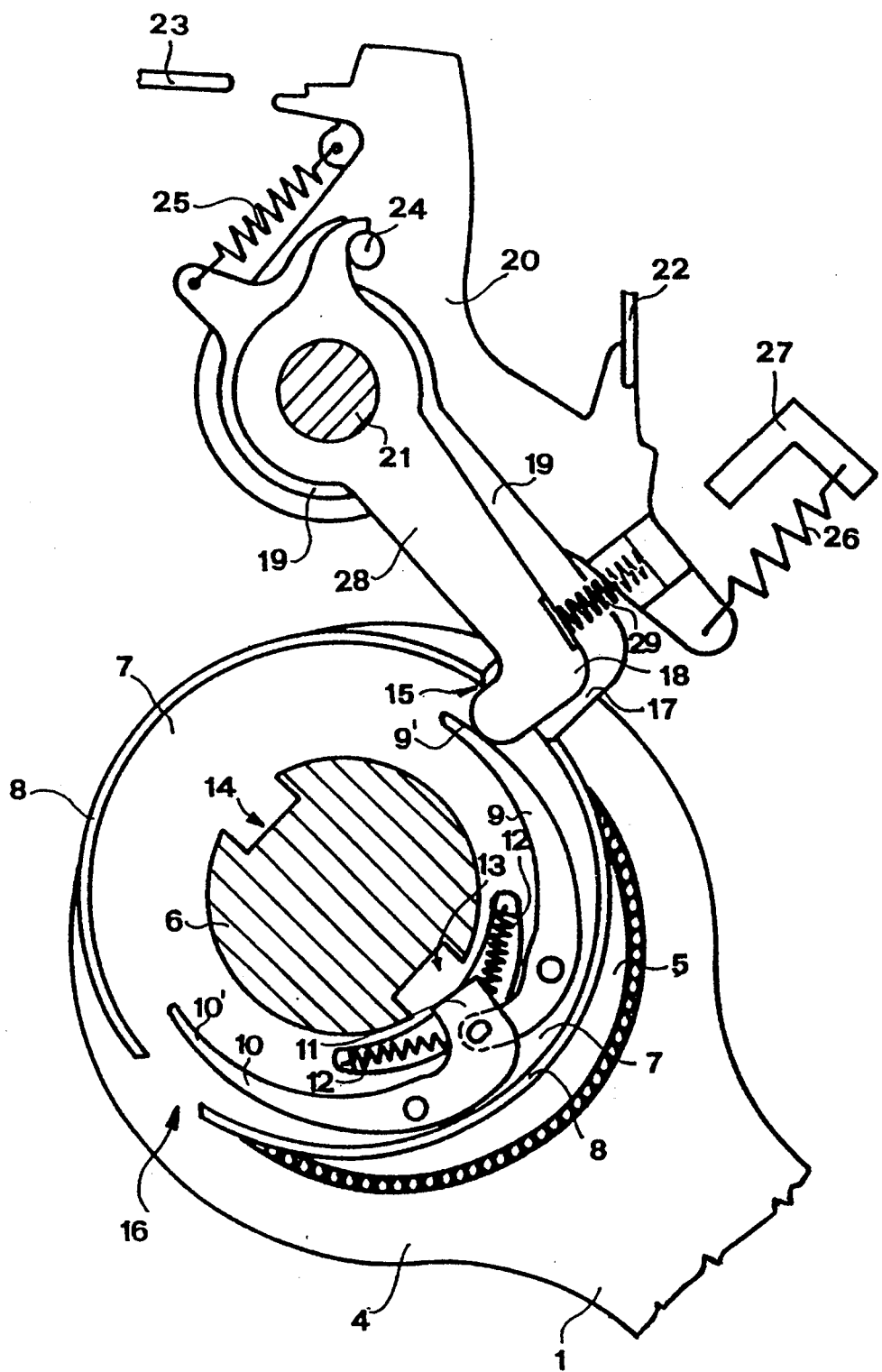
FIG. 3 shows an analogous view to FIG. 2, in another operating step of the revolving dobby.

Furthermore, in as much as said pushers 19 and 20 reciprocate along different length paths, because, whilst the auxiliary pusher 19 must only slide its tooth 17 into the notch 15 or 16, the drive pusher 20 must be capable of continuing its movement through said notch in order to be able to urge, with its tooth 18, the free end 9' of the keying lever 9, and consequently cause the key 11 to swing out from the groove 13, as illustrated in FIG. 3, the auxiliary pusher 19 is urged towards a shoulder 24, integral with the drive pusher 20, by a preloaded spring 25 provided between both said pushers, whilst the drive pusher 20 is urged by the spring 26 against the stationary shoulder 27 so as to keep the thrust teeth 17 and 18 out from said external edge 8, as illustrated in FIG. 2.

Figure 4:
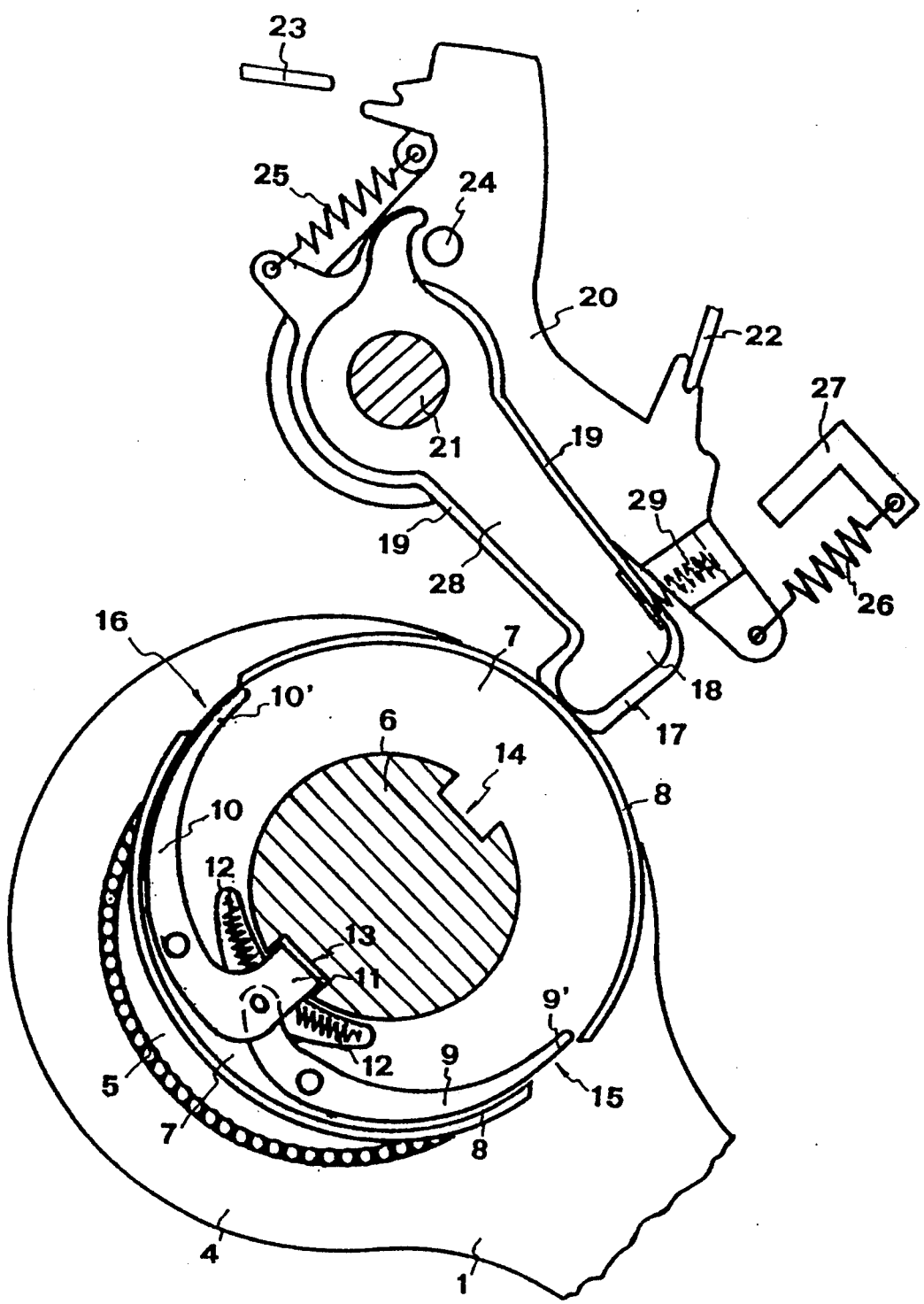
FIG. 4 shows an analogous view to FIG. 2, an operating step of the revolving dobby in the presence of an abnormal situation.

On the other hand, in order to allow the drive pusher 20 to move along its whole stroke imposed by said cam drive means when, in the presence of a whatever abnormal situation, its tooth 18, by not being any longer opposite to one of notches 15 or 16, comes to urge, together with the tooth 17 of the auxiliary pusher 19, onto the external surface of the edge 8 as illustrated in FIG. 4, said tooth 18 is made integral with an arm 28 which, by being pivotally hinged onto said shaft 21, is urged against said shoulder 24 by a pressure spring 29 acting between said arm 28 and said drive pusher 20. In that way, in fact, the longer stroke of the drive pusher 20 is made possible by the higher compression of said spring 29 (see, again, FIG. 4).

I claim:

1. A cam and dobby apparatus comprising,
a dobby and an intermittent-motion drive shaft including longitudinally extending, oppositely positioned grooves;
a cam and plate member, said cam being positioned between said intermittent-motion drive shaft and a head of a main connecting rod that is installed idling on said intermittent-motion drive shaft, said plate member having a peripheral edge that extends outwardly from a surface of said plate member and includes oppositely positioned notches therein, first and second spring biased key levers pivotally connected to the surface of said plate member, one of said key levers having a first end that can be received by and cooperates with one of said grooves to lock said cam in rotatable position with said intermittent-motion drive shaft, said key levers each having second free ends terminating adjacent to said notches, said second free ends being supported and protected by said outwardly extending peripheral edge of said plate member; and a drive pusher and a rotatably hinged auxiliary pusher mounted on a common axis, thereby superimposing said drive pusher on said auxiliary pusher, each of said drive and auxiliary pushers have a thrust tooth at one end thereof that can be received by either of said notches, first spring means urging one end of said auxiliary pusher towards a fixed support and said auxiliary pusher thrust tooth into engagement with one of said notches and, second spring means engaging a shoulder of said drive pusher to force said thrust tooth of said drive pusher into said notch to engage one of said key levers and to disengage said first end of said key lever from said groove of said shaft.

2. An apparatus according to claim 1, wherein said plate is ring-shaped and concentrically disposed about said cam.

* * * * *